United States Patent
Oh

(10) Patent No.: US 7,131,635 B2
(45) Date of Patent: Nov. 7, 2006

(54) REMOVABLE INTERCONNECTION OF AN ACTUATOR TO A VALVE BODY

(75) Inventor: Michael Hung-Sun Oh, Rockford, IL (US)

(73) Assignee: Invensys Building Systems, Inc., Loves Park, IL (US)

( * ) Notice: Subject to any disclaimer, the term of this patent is extended or adjusted under 35 U.S.C. 154(b) by 146 days.

(21) Appl. No.: 11/015,449

(22) Filed: Dec. 17, 2004

(65) Prior Publication Data

US 2006/0131532 A1    Jun. 22, 2006

(51) Int. Cl.
F16K 31/00 (2006.01)
(52) U.S. Cl. .................................................. 251/292
(58) Field of Classification Search ............. 251/292, 251/128, 291, 129.11
See application file for complete search history.

(56) References Cited

U.S. PATENT DOCUMENTS

| | | | |
|---|---|---|---|
| 5,131,623 A * | 7/1992 | Giordani ............... | 251/129.03 |
| 6,073,907 A | 6/2000 | Schreiner, Jr. et al. | |
| 6,361,019 B1 | 3/2002 | Massey | |
| 6,880,806 B1 * | 4/2005 | Haikawa et al. ........... | 251/292 |

FOREIGN PATENT DOCUMENTS

| | | |
|---|---|---|
| DE | 84 07 586 | 6/1984 |
| DE | 102 46 996 | 5/2003 |
| EP | 1 418 373 | 5/2004 |

OTHER PUBLICATIONS

U.S. Appl. No. 10/897,908, filed Jul. 23, 2004, Shike.

* cited by examiner

Primary Examiner—Justine R. Yu
Assistant Examiner—Andrew J. Rost
(74) Attorney, Agent, or Firm—Reinhart Boerner Van Deuren P.C.

(57) ABSTRACT

A valve apparatus includes selectively releasable engagement apparatus for operatively connecting an actuator to a valve body of a valve having an operating member extending outwardly from the valve body along an axis of the operating member are provided. The engagement apparatus includes a latch arm extending from the valve side of a base, rather than the actuator side of the base. A plurality of protrusions on the valve body and corresponding mating receptacles on the base resist torque forces on the base. A slot in the base adjacent an edge of the latch arm provides passage for tooling used in forming the base. A base in the form of an adapter allows attachment of an actuator not having a selectively releasable engagement apparatus to a valve body that does include a selectively releasable engagement apparatus.

26 Claims, 7 Drawing Sheets

REMOVABLE INTERCONNECTION OF AN ACTUATOR TO A VALVE BODY

FIELD OF THE INVENTION

This invention relates to actuator driven valves, and more particularly to providing a snap-on, selectively releasable connection of an actuator to a valve body in a valve apparatus.

BACKGROUND OF THE INVENTION

In valve apparatuses having an actuator operatively connected to a valve stem or other operating member of a valve, it is sometimes desirable to have the actuator be connected to the valve by a selectively releasable engagement apparatus, so that the actuator can readily be removed from or attached to the valve without the use of tools. Commonly assigned U.S. Pat. No. 6,073,907, to Schreiner, et al, and commonly assigned U.S. patent application Ser. No. 10/897,908, to Shike, describe such selectively releasable engagement apparatuses, with the disclosures therein being incorporated herein by reference.

While the apparatuses of Schreiner and Shike work well for their intended purposes, additional improvement is desirable in several areas. It is desirable to modify the apparatuses of Schreiner and Shike, to provide, inter alia: improved manufacturability; additional resistance to torque loads generated during operation of the actuator; reduction of the force that must be exerted on a latch arm for releasing the actuator from the valve; continued compliance with applicable government standards and regulations; and means for adapting actuators that were originally designed for permanent attachment to a valve body so that they can be used with valves designed for use with actuators having features allowing selectively releasable engagement of the actuator to the valve body.

BRIEF SUMMARY OF THE INVENTION

The invention provides an improved selectively releasable engagement apparatus for operatively connecting an actuator to a valve body of a valve having an operating member extending outwardly from the valve body along an axis of the operating member, by moving a latch arm to the valve side of a base plate, as compared to prior engagement apparatuses, such as those described in the commonly assigned U.S. Pat. No. 6,073,907, to Schreiner, et al, and commonly assigned U.S. patent application Ser. No. 10/897,908, to Shike, referenced above, which disposed a latch arm on the actuator side of a base plate. Placing the latch arm on the valve side of the base plate, according to the invention, provides advantages including improved manufacturability, and lowering the operating force required for flexing the latch arm to release the actuator from the valve.

In one form of the invention, a selectively releasable engagement apparatus is provided for operatively connecting an actuator to a valve body of a valve having an operating member extending outwardly from the valve body along an axis of the operating member. The engagement apparatus includes a protrusion extending from the valve body, and a base. The protrusion extends from the valve body in a direction generally parallel to the axis of the operating member, with the protrusion including a notch therein. The base is configured as a generally planar plate having a first surface thereof attachable to the actuator and a second oppositely facing surface thereof including a receptacle for receiving the protrusion. The base further includes a selectively movable latch arm operatively attached for flexing movement adjacent to the second surface of the base, with the latch arm including a locking tab portion thereof biased by the latch arm for engagement with the notch in the protrusion when the protrusion is disposed in the receptacle. The protrusion maybe integral to the valve body, and the receptacle and latch arm may be integral to the base.

In some forms of the invention, the valve body includes one or more additional protrusions extending generally parallel to the axis, the base includes one or more additional corresponding receptacles for receiving the one or more additional protrusions, to thereby improve resistance to torque loads on the base about the axis. The valve body may further include a collar protruding there from about the operating member, with the collar having an outer peripheral surface thereof. The base may include a second receptacle extending from the second surface of the base for passage therethrough of the operative member, and having a inner wall thereof for engaging the outer peripheral surface of the collar. At least one of the first and second receptacles may include an axially facing surface thereof for engaging a mating axially facing surface on one or both of the protrusion and the collar. At least one of the additional protrusions may include an axially facing surface thereof for engaging an mating axially facing surface on its corresponding receptacle.

The latch arm, in an engagement apparatus according to the invention, may further include a distal end and an opposite end thereof, connected by an intermediate portion of the latch arm. The locking tab may be disposed adjacent to distal end of the latch arm, with the opposite end of the latch arm being fixedly attached to the remainder of the base at a point remote from the receptacle and at least a portion of the remainder of the latch arm being spaced away from the second surface of the base, so that the latch arm can be selectively flexed in a direction transverse to the axis of the operating member, for disengaging the locking tab from the notch.

The base may include a slot therein, disposed adjacent at least part of the latch arm, with the slot extending along the at least part of the latch arm. The at least part of the latch arm may define an edge of the latch arm located adjacent the second surface of the base. The edge may define a cross sectional projection thereof onto the second surface of the base, with the slot having a cross sectional profile thereof substantially matching the cross sectional projection of the edge of the latch onto the second surface of the base. The slot may provide passage for tooling utilized in forming the base, during a process such as integrally molding the entire base including the latch arm, to thereby facilitate manufacture of an engagement apparatus according to the invention. The slot may also have a width substantially equal to ⅛ of an inch or less, to comply with applicable standards and regulations relating to electrical equipment including electric motor driven actuators.

In some forms of the invention, the actuator may include an actuator housing, with the base of the engagement apparatus forming part of the actuator housing. Where the actuator includes internal components, the first surface of the base may be adapted to allow the internal, components to be attached thereto. In other forms of the invention, the base may function as an adapter for attachment to an actuator housing of an actuator including an output adapted for operative connection to the operating member of the valve, and an actuator housing having an opening therein for passage of either or both of the output of the actuator and the operating member of the valve. Particularly where the base is used as an adapter, an engagement apparatus according to the invention may further include a connector member adapted for operatively connecting the output of the actuator to the output member of the valve. The collar of the base may be configured for operatively receiving the connector member.

The invention may also take the form of a valve apparatus including a valve having a valve body and an operating member extending outwardly from the valve body along the axis of the operating member in combination with a selectively releasable engagement apparatus, according to the invention, for operatively connecting an actuator to the valve body. A valve apparatus, according to the invention, may further include an actuator attached to the base. The engagement apparatus of a valve apparatus according to the invention may further include a connector member for operatively connecting an output of the actuator the operating member of the valve.

In either an engagement apparatus, or a valve apparatus according to the invention, the base of the engagement apparatus may be configured for adapting actuators that were originally designed for permanent attachment to a valve body, so that the actuators originally designed for permanent attachment can be used with valves designed for use with actuators having features allowing selectively releasable engagement of the actuator with the valve body. When used in this manner, an engagement apparatus according to the invention, allows the use of two or more actuators of different sizes or configurations with a given valve body or vise versa.

Other aspects, objectives, and advantages of the invention will be apparent from the following detailed description and the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
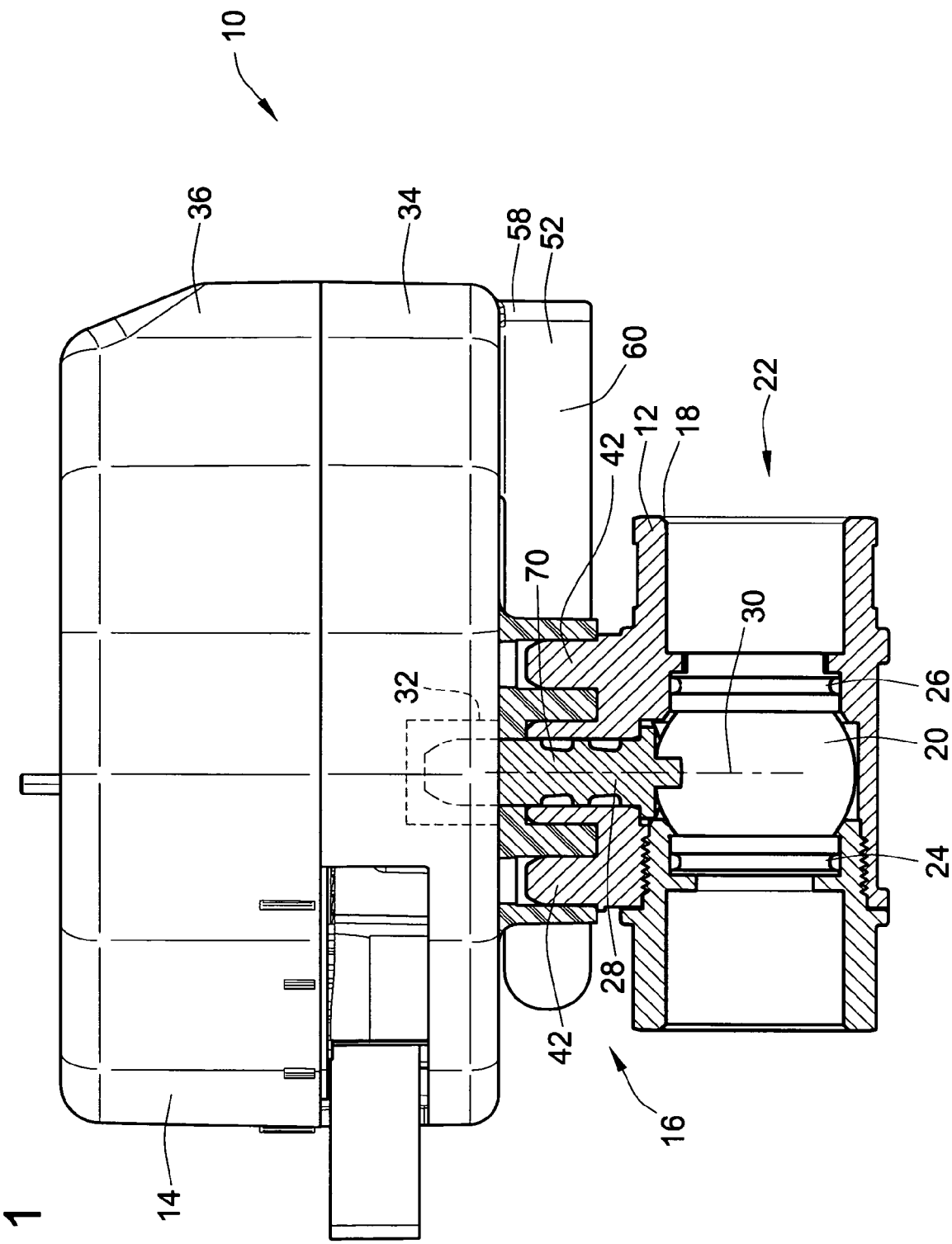
FIG. 1 is a partial cross sectional view of an exemplary embodiment of a valve apparatus, according to the invention, having a selectively releasable engagement apparatus for operatively connecting an actuator, of the valve apparatus, to a valve of the valve apparatus.

FIG. 1 shows a first exemplary embodiment of the invention in the form of a valve apparatus 10, including a valve 12, an actuator 14, and a selectively releasable engagement apparatus 16 for operatively connecting the actuator 14 to a valve body 18 of the valve 12. The valve 12, of the exemplary embodiment, is a ball valve having a spherical valve member 20 rotatively mounted in a flow path 22 defined by the valve body 18 between a first bearing 24 and a second bearing 26. The ball valve 12 further includes an operating member, in the form of a valve stem 28 which extends outwardly from the valve body 18 along an axis 30 of the operating member 28. The actuator 14 includes an output 32 which is configured to be operatively attachable to the valve stem 28 of the valve 12.

As will be better understood from the following description, the selectively releasable engagement apparatus 16, of the exemplary embodiment, includes features which are integrally joined to the valve body 18, that mate with corresponding features which are integral to a base 34 forming the bottom part (as oriented in FIGS. 1 and 3) of an actuator housing 36 of the actuator 14. As will be understood from the following description, although the base 34 in the embodiment shown in FIGS. 1–4 forms part of the housing 36, enclosing internal components of the actuator 14, in other embodiments of the invention the base may take other shapes, and not form part of an associated actuator housing or enclosure.

As shown in FIGS. 1–4, the selectively releasable engagement apparatus 16 of the exemplary embodiment of the valve apparatus 10 includes a first protrusion 38, having a notch 40 therein, and two additional protrusions, 42. The first and additional protrusions 38, 42, 42 are oriented to extend from the valve body 18 in a direction generally parallel to the axis 30 of the valve stem 28.

Figure 3:
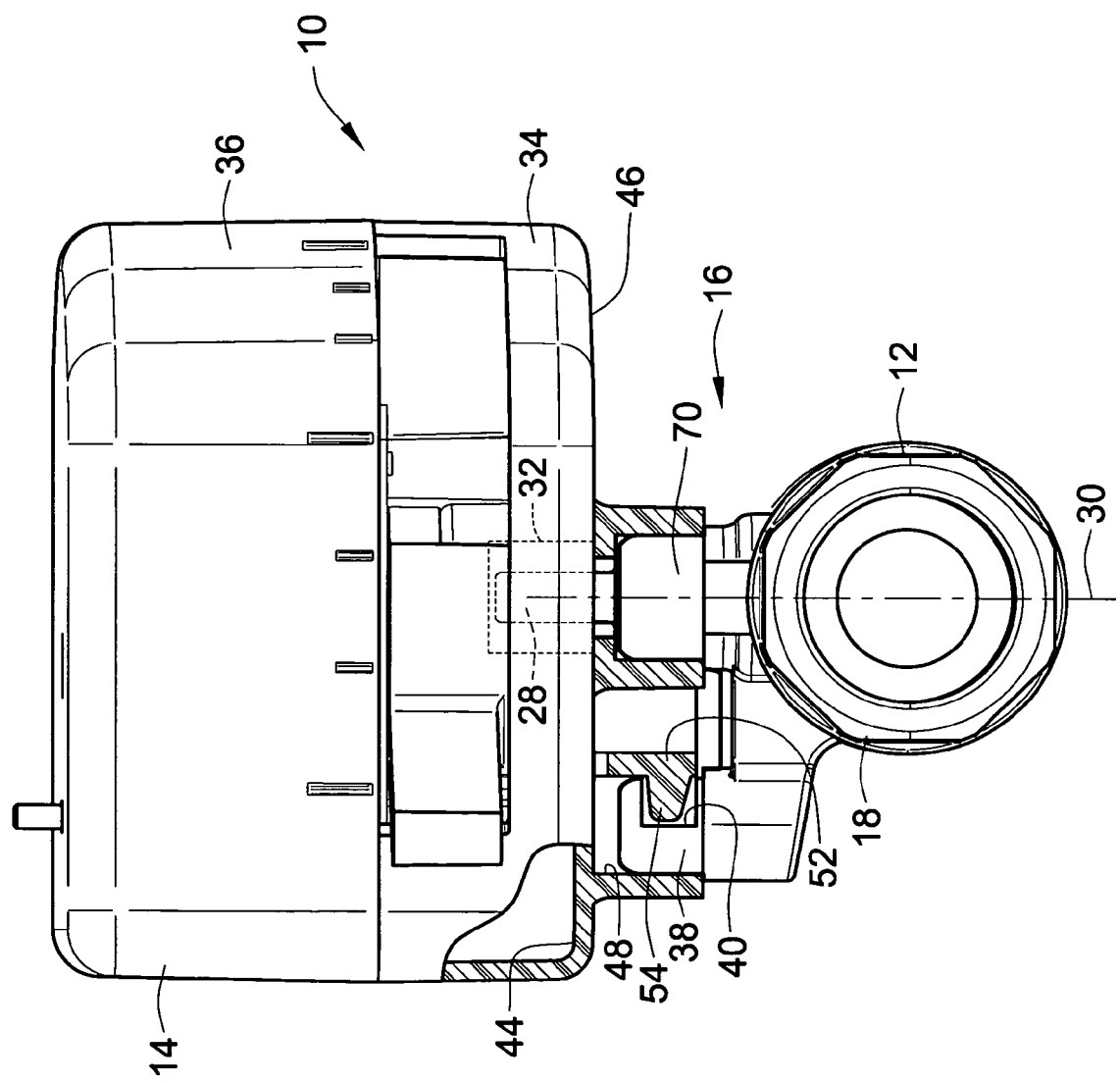
FIG. 3 is a partial cross sectional end view of the valve apparatus of FIG. 1.
Figure 4:
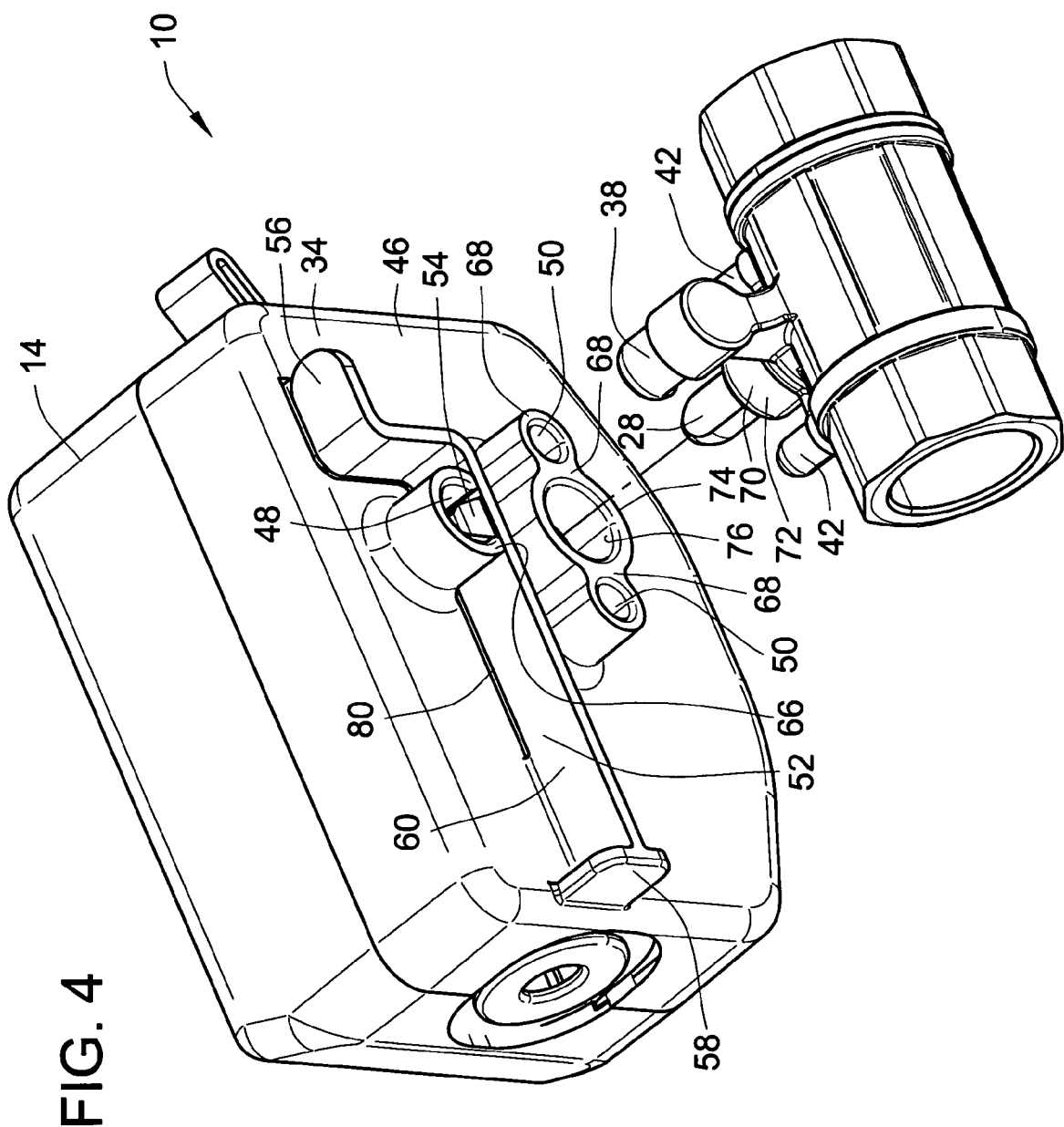
FIG. 4 is an exploded view of the exemplary embodiment of the valve apparatus shown in FIG. 1.

As best seen in FIGS. 3 and 4, the base 34 of the selectively releasable engagement apparatus 16 of the exemplary embodiment is configured as a generally planar plate having a first surface 44 thereof adapted to be attached to and facing towards the actuator 14, and a second, oppositely facing surface 46 thereof which includes a first receptacle 48 for receiving the first protrusion 38. The base 34 also includes two additional receptacles 50 for receiving the two additional protrusions 42.

As shown in FIGS. 1, 3 and 4, the base 34 further includes a selectively movable latch arm 52 which is operatively attached to the remainder of the base 34 for flexing movement adjacent the second surface 46 of the base 34. The latch arm 52 includes a locking tab 54 that is biased by the latch arm 52 for engagement with the notch 40 in the first protrusion 38, when the first protrusion is disposed in the first receptacle 48, as shown in FIG. 3.

As shown in FIG. 4, the locking tab 54 is disposed adjacent to a distal end 56 of the latch arm 52 with the opposite end 58 of the latch arm 52 being fixedly attached to the base 34 at a point remote from the first receptacle 48. The distal and opposite ends 56, 58 of the latch arm 52 are connected by an intermediate portion 60 of the latch arm 52 extending between the distal and opposite ends 56, 58 of the latch arm 52.

Figure 5:
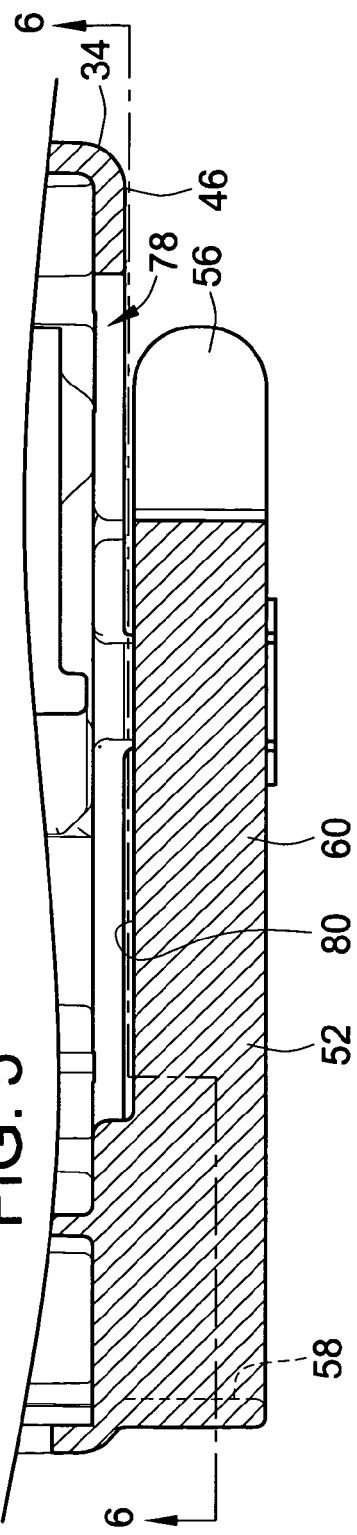
FIGS. 5 and 6 are enlarged partial cross sectional views showing details of a portion of the selectively releasable engagement apparatus of FIGS. 1–4.

As shown in FIG. 5, all but the opposite end 58 of the latch arm 52 is spaced away from the second surface 46 of the base 34, so that the latch arm 52 can be selectively flexed in a direction transverse to the axis 30 of the valve stem 28 for disengaging the locking tab 54 from the notch 40, so that the actuator 14 can be removed from the valve 12.

Figure 2:
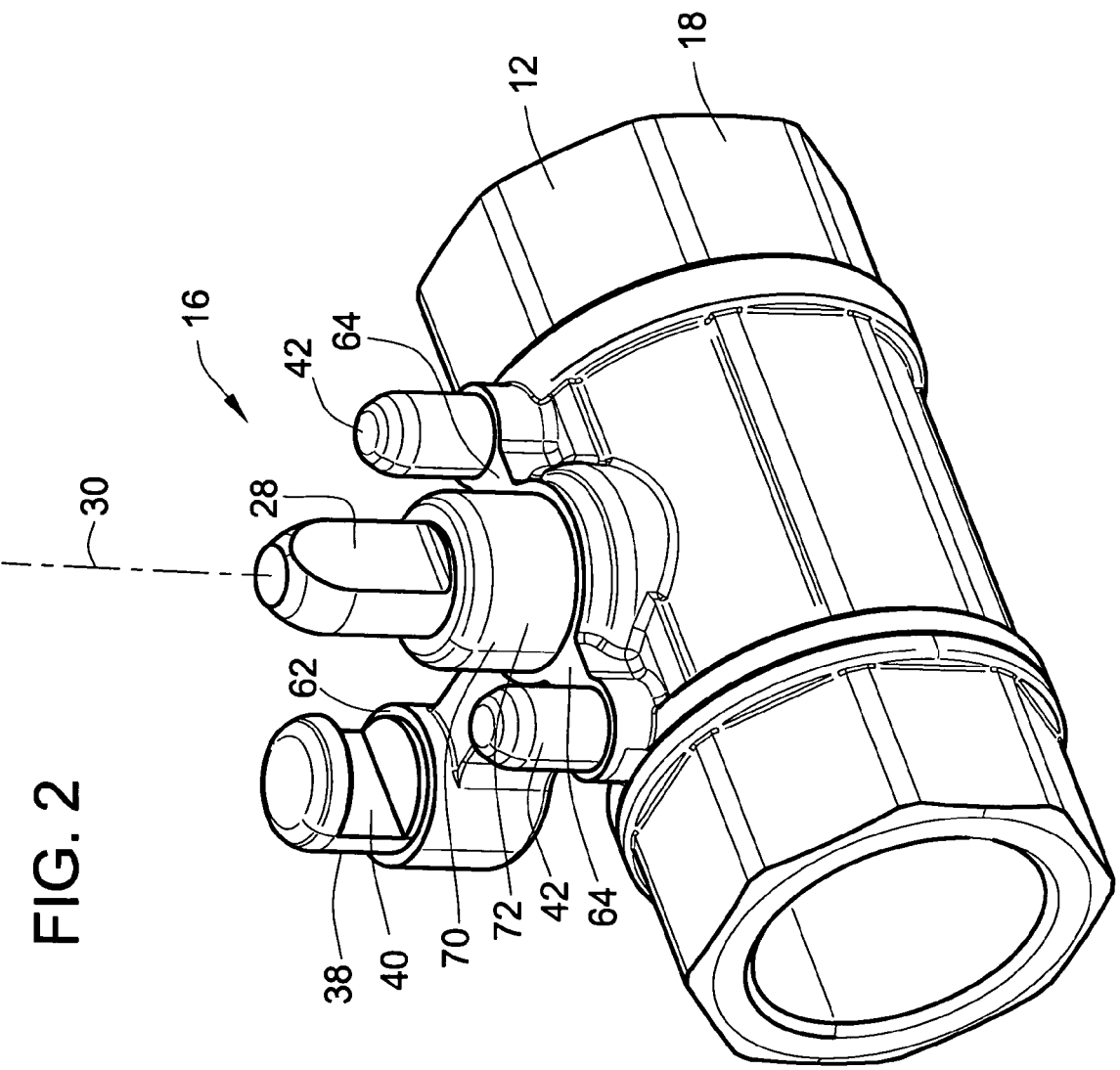
FIG. 2 is a perspective view of the valve of the exemplary embodiment of the valve apparatus shown in FIG. 1.

As shown in FIGS. 2 and 4, the first protrusion 38 and the two additional protrusions 42 each include respective axially facing surfaces 62, 64 thereof for engaging respective axially facing mating surfaces 66, 68, 68 on the corresponding first or additional receptacles 48, 50. The mating axially surfaces 62, 64, 66, 68 on the first and additional protrusions 38, 42, 42 and the first and additional receptacles 48, 50, 50 provides axial location of the actuator 14 with respect to the valve body 18, and a stable mounting arrangement that keeps the output 32 of the actuator aligned with the axis 30 of the valve stem 28 and precludes having the actuator being canted with respect to the valve body 18. It will further be appreciated that, by locating the first and additional protrusions 38, 42 at a radially spaced distance from the axis 30 of the valve stem, the first and additional protrusion 38, 42, 42 can effectively and efficiently react the torque applied to the output 32 of the actuator 14.

As shown in FIGS. 1–4, the valve body 18, of the exemplary embodiment of the invention, further includes a collar 70 having an outer peripheral surface 72. As best seen in FIG. 4, the base 34 includes a collar receptacle 74 extending from the second surface 46, for passage through the collar 70 and the valve stem 28. The collar receptacle 74 includes an inner wall 76 thereof, for engaging the outer peripheral surface 72 of the collar 70.

Those having skill in the art will recognize that, if the valve 12 and actuator 14 are not configured and positioned relative to one another such that the axis 30 of the valve stem 28 is vertical and passing through the center of gravity of the actuator 14, a tilting moment of the actuator 14 about the engagement apparatus 16 will be generated. It is preferred that this tilting moment be reacted primarily through the collar 70 and additional protrusions 42, and their associated receptacles 74, 50, 50, rather than through either the valve stem 28 or the first protrusion 38 and first receptacle 48. Imposing a substantial portion of a tilting moment on the valve stem 28 could potentially cause the valve stem 28 to bind, or even bend, and could also cause leakage past seals at the juncture of the valve stem 28 and the valve housing 18. Imposing a substantial portion of a tilting moment on the first protrusion 38 and the first receptacle 48 could potentially cause disconnection of the locking tab 54 from the notch 40 in the first protrusion 38.

While, ideally, the valve 12 and actuator 14 would always be configured and connected to one another in an orientation that would preclude the generation of a tilting moment, those skilled in the art will recognize that this may not be achievable in practice, for a number of reasons. For example, it may be necessary in some plumbing circuits to mount the valve 12 with the axis 30 of the valve stem 28 not oriented vertically. The center of gravity of the actuator 14 may also be offset from the axis 30 when the output 32 of the actuator 14 is connected to the valve stem 28.

The engagement apparatus 16 of the exemplary embodiments described herein with relation to FIGS. 1–5 is specifically configured to react any tilting moment primarily through the collar 70 and additional protrusions 42, and their associated receptacles 74, 50, 50, rather than through either the valve stem 28, or the first protrusion 38 and first receptacle 48.

Specifically, the outer peripheral surface 72 of the collar 70 and the inner wall 76 of the collar receptacle 74 are sized to provide a tight sliding fit of the collar 70 within the collar receptacle 74. The outer peripheral surface 72 of the collar 70 is also relatively large, and has a substantial engagement length with inner wall 76 of the collar receptacle 74 along the axis 30 of the valve stem 28. The large size and substantial engagement length of the collar 70 with the collar receptacle 74 allow the collar 70 and collar receptacle 74 to absorb virtually all of the tilting moments that would otherwise be imposed on the valve stem 28 and/or the first protrusion 38. In similar fashion, the two additional protrusions 42 have outer peripheries which are also relatively large, and configured to provide substantial engagement length with inner walls of the additional receptacles 50, in parallel with the axis 30 of the valve stem 28.

The collar 70 and additional protrusions 42 thus work together to substantially react any tilting moment that may be imposed by the configuration and relative orientation of the valve 12 and actuator 14. It will be recognized, however, by those having skill in the art, that in other embodiments of the invention, other arrangements may be utilized wherein the collar alone reacts substantially all of the tilting moment. In yet other embodiments, one or more additional protrusions may be configured to react substantially all of the tilting moment, with only a small or substantially no contribution to reacting the moment being provided by the collar. In yet further other embodiments, the first protrusion and its associated receptacle may provide a substantial contribution to reacting a tilting moment, in combination with other features such as the collar and/or one or more additional protrusions.

From the description above, it will be apparent that, in the exemplary embodiments described thus far, features of the invention such as the collar 70, additional protrusions 42, and the first protrusion 38 may provide multiple functions relating to resisting torque from the actuator, reacting tilting moments, and securing the actuator 14 to the valve 12. It will be recognized by those having skill in the art, however, that in other embodiments of the invention, these functions may be shared differently than they are in the exemplary embodiments described herein, and may be assisted in performing these functions by additional features which are within the scope of the appended claims, but are not specifically disclosed herein.

Figure 6:
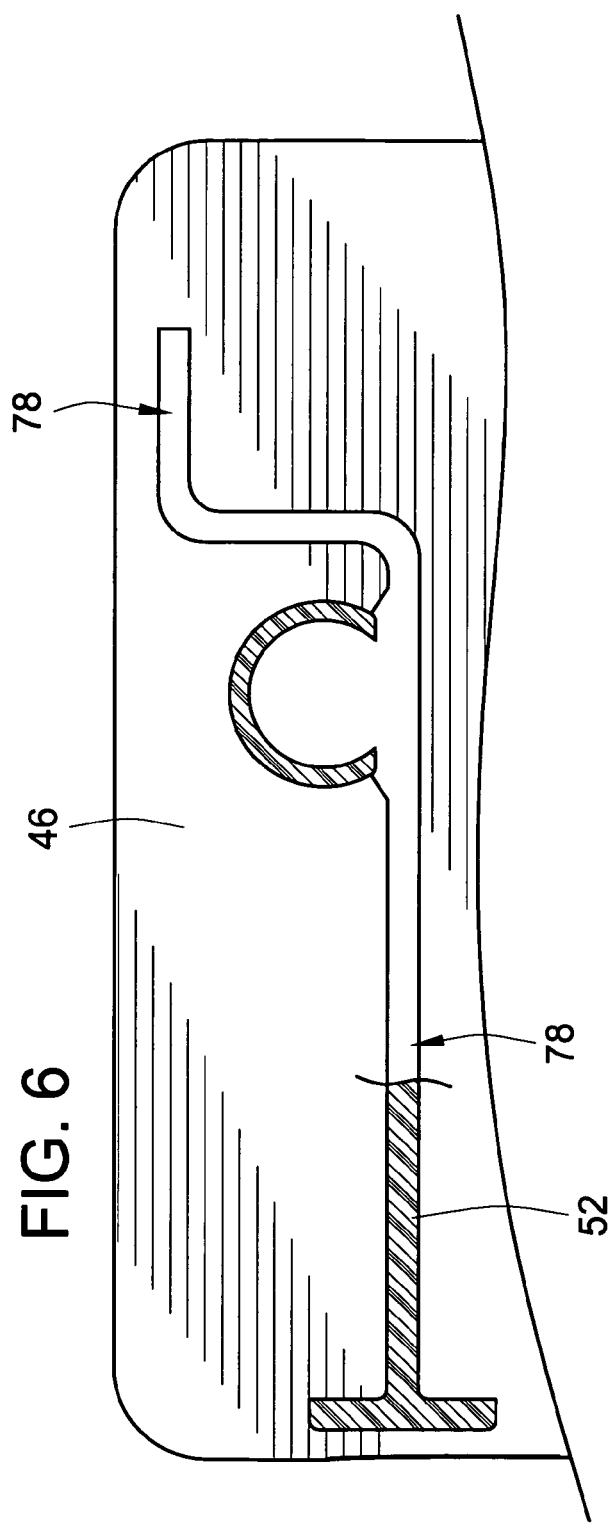

As shown in FIG. 5 and 6, the base 34 includes a slot 78 therein, located adjacent at least part of the latch arm 52. The slot 78 extends along at least part of the intermediate portion 60, the distal end 56, the latch arm 52. An edge 80 of the latch arm 52, adjacent to the second surface 46 of the base 34, defines a cross sectional projection thereof on to the second surface 46 of the base 34, and the slot 78 has a cross sectional profile thereof which substantially matches the cross sectional projection of the edge 80 of the latch arm 52 onto the second surface 46 of the base 34. In some embodiments of the invention, the slot 78 allows a portion of mold tooling used to fabricate the base 34, to extend through the base 34 from the first surface 44 of the base 34 to form the edge 80 of the latch arm 52. It will be understood that the slot 78 may not be required in many embodiments of the invention. Where the slot 78 is included, however, it is preferred that the slot 78 have a width that is substantially equal to one eighth of an inch or less, so that the width of the slot 78 will meet applicable safety standards and governmental regulations relating to electric motor driven actuators.

In the exemplary embodiment of the invention described above, the base 34 of the selectively releasable engagement apparatus 16 is part of the actuator housing 36. In other embodiments of the invention, however, it is desirable to have the base 34 of the selectively releasable engagement apparatus 16 be separate from the actuator housing 36, with the base 34 being adapted for attachment thereto of one or more actuators 14 having different operating characteristics, and/or configurations.

Figure 7:
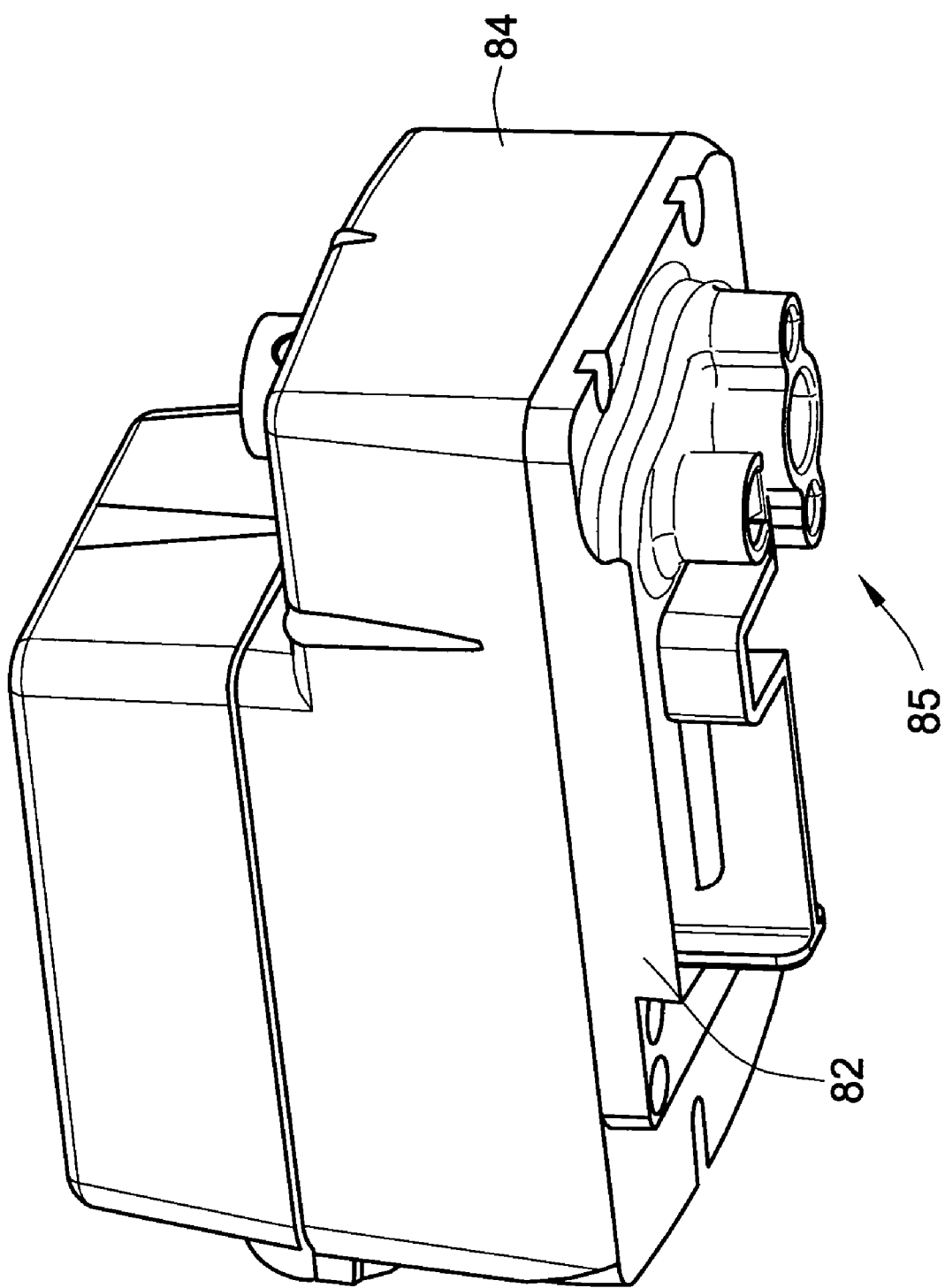
FIG. 7 is a perspective view of a second exemplary embodiment of the invention, in the form of an adapter including a selectively releasable engagement apparatus for attachment to an actuator that does not otherwise incorporate such a selectively releasable engagement apparatus, to thereby allow the actuator to be attached to a valve of the type shown in FIG. 2.
Figure 8:
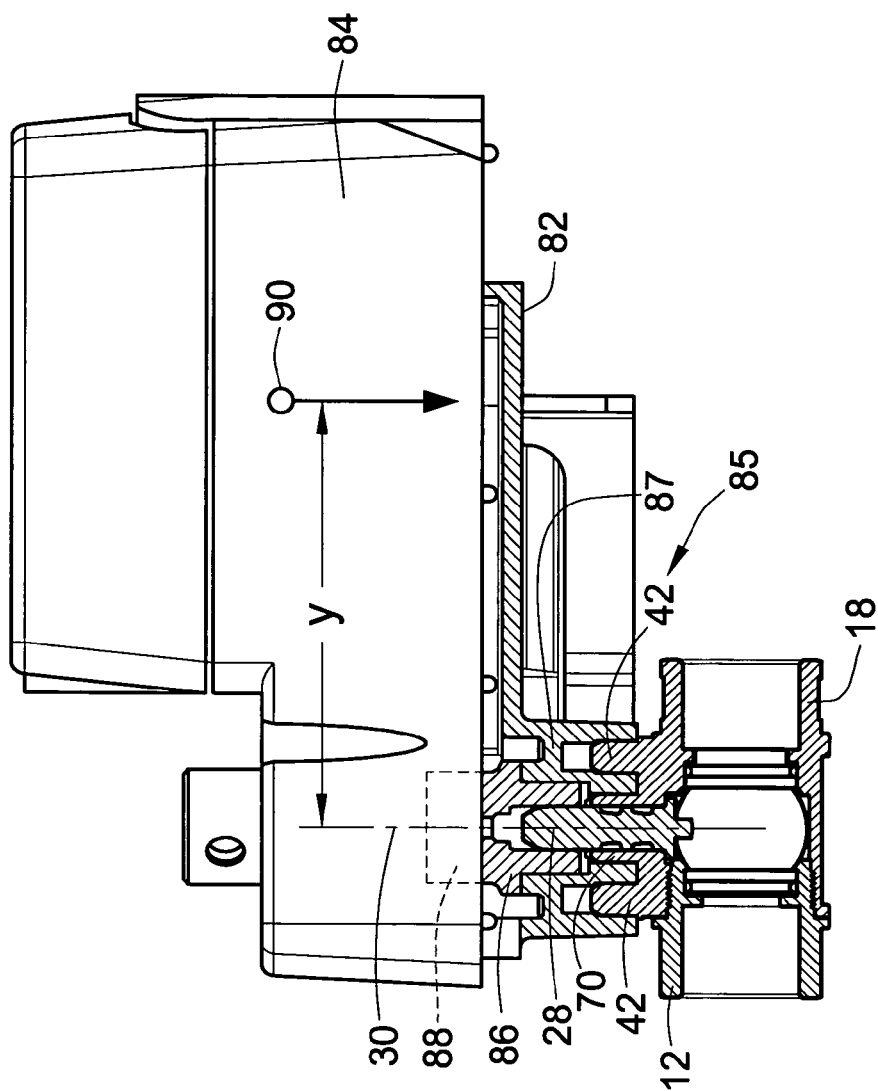
FIGS. 8 and 9 are partial cross sectional end and side views respectively of the second exemplary embodiment shown in FIG. 7
Figure 9:
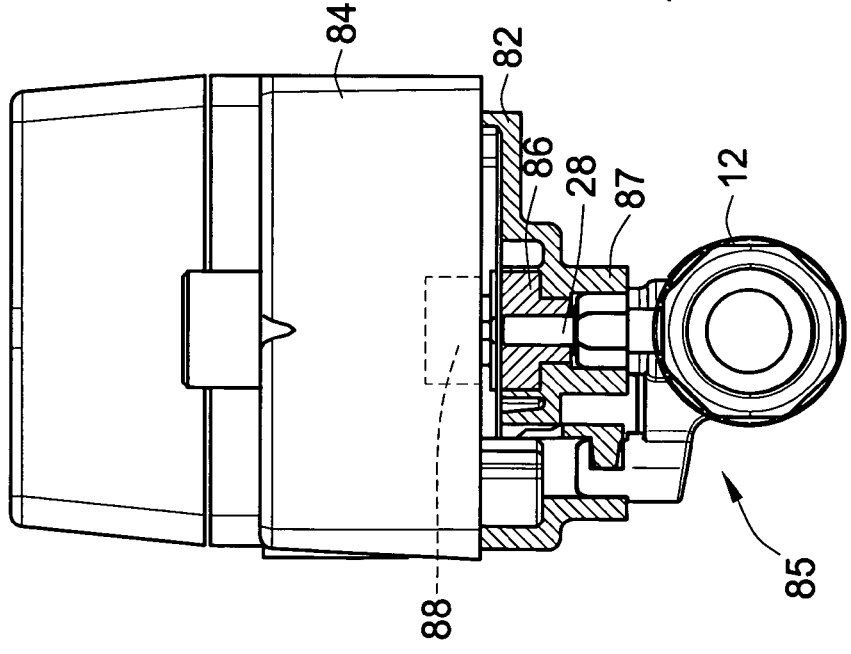

For example, as shown in FIGS. 7–9, in some embodiments of the invention the base may take the form of an adapter 82 having selectively releasable features 85, which can be affixed to an actuator 84 that does not include the features of a selectively releasable engagement apparatus, according to the invention. By virtue of this arrangement, the actuator 84 may be joined by the selectively releasable engagement apparatus 85 of the adapter 82 to the same valve 12 used with the actuator 14, which included a base plate 34 incorporating features of the selectively releasable engagement apparatus 16 described above. In the exemplary embodiment shown in FIGS. 7–9 the selectively releasable engagement apparatus 85 also includes a connector member 86, disposed in a boss 87 of the adapter 82, for operatively connecting the valve stem 28 to an output 88 of the actuator 84.

As illustrated in FIG. 9, the configuration of the actuator 84 is such that the center of gravity 90 is offset by a distance 'y' from the axis 30 of the valve stem 28, and therefore generates a tilting moment that must be reacted. The adapter 82 includes tightly fitting receptacles for the collar 70 and additional protrusions 42 of the valve body 18, so that the engagement apparatus 85 including the adapter 82 of the second exemplary embodiment will substantially react the tilting moment through the collar 70 and the additional protrusions 42 of the valve 12 in the same manner as described above in relation to the first exemplary embodiment of the invention having the base 34 formed by the bottom portion of the actuator housing 36.

Those having skill in the art will also recognize that, although invention has been described herein with reference to several exemplary embodiments, many other embodiments of the invention are possible.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A selectively releasable engagement apparatus for operatively connecting an actuator to a valve body of a valve having an operating member extending outwardly from the valve body along an axis of the operating member, the engagement apparatus comprising:
   a protrusion extending from the valve body in a direction generally parallel to the axis of the operating member, the protrusion including a notch therein; and
   a base comprising a generally planar plate having a first surface thereof attachable to the actuator and a second oppositely facing surface thereof including a receptacle for receiving the protrusion, the base further comprising a selectively movable latch arm operatively attached for flexing movement along the second surface of the base, the latch arm having a locking tab portion thereof biased by latch arm for engagement with the notch in the protrusion when the protrusion is disposed in the receptacle.

2. The engagement apparatus of claim 1, wherein the protrusion is integral to the valve body and the receptacle and latch arm are integral to the base.

3. The engagement apparatus of claim 1, wherein the valve body includes one or more additional protrusions extending generally parallel to the axis, and the base includes one or more corresponding additional receptacles for receiving the one or more additional protrusions.

4. The engagement apparatus of claim 3, wherein the additional protrusions and their corresponding additional receptacles are spaced from the axis, to thereby for resisting torque loads on the base about the axis.

5. The engagement apparatus of claim 1, wherein:
   the valve body further comprises a collar protruding therefrom about the operating member, the collar having an outer peripheral surface thereof; and
   the base includes a second receptacle extending from the second surface for passage therethrough of the operating member and having an inner wall thereof for engaging the outer peripheral surface of the collar.

6. The engagement apparatus of claim 5, wherein the outer peripheral surface of the collar and the inner wall of the second receptacle are configured to fit together tightly in a sliding fit, and have an engagement length sufficient for substantially reacting a tilting moment.

7. The engagement apparatus of claim 6, wherein the valve body includes one or more additional protrusions extending generally parallel to the axis, and the base includes one or more corresponding additional receptacles for receiving the one or more additional protrusions.

8. The engagement apparatus of claim 7, wherein the additional protrusions and their corresponding additional receptacles are spaced from the axis, to thereby for resisting torque loads on the base about the axis.

9. The engagement apparatus of claim 6, wherein at least one of the additional protrusions includes an axially facing surface thereof for engaging a mating axially facing surface on its corresponding receptacle.

10. The engagement apparatus of claim 5, wherein at least one of the first and second receptacles includes an axially facing surface thereof for engaging a mating axially facing surface on one or both of the protrusion and the collar.

11. The engagement apparatus of claim 10, wherein the valve body includes one or more additional protrusions extending generally parallel to the axis, and the base includes one or more additional corresponding receptacles for receiving the one or more additional protrusions.

12. The engagement apparatus of claim 1, wherein the latch arm further includes a distal end and an opposite end thereof connected by an intermediate portion of the latch arm, with locking tab being disposed adjacent the distal end of the latch arm, the opposite end of the latch arm being fixedly attached to the remainder of the base at a point remote from the receptacle, and the remainder of the latch arm being spaced away from the second surface of the base, so that the latch arm can be selectively flexed in a direction transverse to the axis of the operating member for disengaging the locking tab from the notch.

13. The engagement apparatus of claim 12, wherein the base includes a slot therein disposed adjacent at least part of the latch arm, with the slot extending along the at least part of the latch arm.

14. The engagement apparatus of claim 13, wherein the latch arm, defines an edge of the latch arm adjacent the second surface of the base, with the edge defining a cross sectional projection thereof onto the second surface of the base, and the slot has a cross sectional profile thereof substantially matching the cross sectional projection of the edge of the latch arm onto the second surface of the base.

15. The engagement apparatus of claim 14, wherein the slot has a width substantially equal to one eighth of an inch or less.

16. The engagement apparatus of claim 1, wherein the actuator includes an actuator housing, and the base forms part of the actuator housing.

17. The engagement apparatus of claim 16, wherein the actuator includes internal components, and the first surface of the base is adapted for having the internal components attached thereto.

18. The engagement apparatus of claim 1, wherein:
the actuator includes an output adapted for operative connection to the operating member of the valve, and an actuator housing having an opening therein for passage of either or both of the output of the actuator and the operating member of the valve; and
the base and actuator housing are adapted for attachment to one another.

19. The engagement apparatus of claim 18, further comprising a connector member adapted for operatively connecting the output of the actuator to the operating member of the valve.

20. The engagement apparatus of claim 19, wherein a collar of the base is configured for operatively receiving the connector member.

21. A valve apparatus comprising a valve having a valve body and an operating member extending outwardly from the valve body along an axis of the operating member, and a selectively releasable engagement apparatus for operatively connecting an actuator to a valve body, wherein the selectively releasable engagement apparatus includes:
a protrusion extending from the valve body in a direction generally parallel to the axis of the operating member, the protrusion including a notch therein; and
a base comprising a generally planar plate having a first surface thereof attachable to the actuator and a second oppositely facing surface thereof including a receptacle for receiving the protrusion, the base further comprising a selectively movable latch arm operatively attached for flexing movement along the second surface of the base, the latch arm having a locking tab portion thereof biased by latch arm for engagement with the notch in the protrusion when the protrusion is disposed in the receptacle.

22. The valve apparatus of claim 21, further comprising an actuator attached to the base.

23. The valve apparatus of claim 21, wherein the actuator includes an output thereof, and the engagement apparatus further includes a connector member for operatively connecting the output of the actuator to the operating member of the valve.

24. A valve apparatus comprising a valve having a valve body and an operating member extending outwardly from the valve body along an axis of the operating member, an actuator having an output operatively attachable to the operating member of the valve, and a selectively releasable engagement apparatus for operatively connecting an actuator to a valve body, wherein the selectively releasable engagement apparatus includes:
a first protrusion extending from the valve body in a direction generally parallel to the axis of the operating member, the first protrusion including a notch therein;
one or more additional protrusions extending from the valve body in a direction generally parallel to the axis;
a base comprising a generally planar plate having a first surface thereof attached to the actuator and a second oppositely facing surface thereof including a first receptacle for receiving the first protrusion, the base also including one or more additional receptacles each adapted for receiving a corresponding one of the one or more additional protrusions;
the base further comprising a selectively movable latch arm operatively attached to a remainder of the base for flexing movement along the second surface of the base,
the latch arm including a distal end thereof and an opposite end thereof connected to one another by an intermediate portion of the latch arm, the opposite end of the latch arm being fixedly attached to the remainder of the base at a point remote from the first receptacle;
the latch arm further having a locking tab thereof biased by the latch arm for engagement with the notch in the first protrusion when the first protrusion is disposed in the first receptacle, with the locking tab being disposed adjacent the distal end of the latch arm;
a potion of the latch arm not including the opposite end of the latch arm being spaced away from the second surface of the base, so that the portion of the latch arm can be selectively flexed in a direction transverse to the axis of the operating member for disengaging the locking tab from the notch.

25. The valve apparatus of claim 24, wherein at least one or more of the first or additional protrusions includes an axially facing surface thereof for engaging a mating axially facing surface on its corresponding receptacle.

26. The valve apparatus of claim 24, wherein:
the base includes a slot therein disposed in an area of the base adjacent at least part of the latch arm and extending along the at least part of latch arm; and
the least part of the latch arm defines an edge of the latch arm adjacent the second surface of the base, with the edge defining a cross sectional projection thereof onto the second surface of the base and the slot having a cross sectional profile thereof substantially matching the cross sectional projection.

* * * * *